(12) United States Patent
Kindberg

(10) Patent No.: US 6,550,685 B1
(45) Date of Patent: Apr. 22, 2003

(54) METHODS AND APPARATUS UTILIZING VISUALLY DISTINCTIVE BARCODES

(75) Inventor: Timothy P. J. G. Kindberg, Burlingame, CA (US)

(73) Assignee: Hewlett-Packard Development Company LP, Houston, TX (US)

(*) Notice: Subject to any disclaimer, the term of this patent is extended or adjusted under 35 U.S.C. 154(b) by 149 days.

(21) Appl. No.: 09/713,473

(22) Filed: Nov. 14, 2000

(51) Int. Cl.$^7$ ............................................. G06K 19/06
(52) U.S. Cl. ............ 235/494; 235/462.01; 235/462.02; 235/462.03; 235/462.07
(58) Field of Search ....................... 235/462.01, 462.03, 235/462.09, 454, 494

(56) References Cited

U.S. PATENT DOCUMENTS

| | | | | |
|---|---|---|---|---|
| 5,395,181 A | * | 3/1995 | Dezse et al. ................. 235/464 |
| 5,552,593 A | * | 9/1996 | Bliss .......................... 235/495 |
| 5,591,956 A | * | 1/1997 | Longacre, Jr. et al. ...... 235/494 |
| 5,602,382 A | * | 2/1997 | Ulvr et al. ............... 235/462.02 |
| 5,612,524 A | * | 3/1997 | Sant'Asselmo et al. ..... 235/494 |
| 5,726,435 A | * | 3/1998 | Hara et al. .................. 235/494 |
| 5,745,589 A | * | 4/1998 | Iwai et al. .................. 382/100 |
| 5,814,801 A | * | 9/1998 | Wang et al. ................. 235/454 |
| 5,932,862 A | * | 8/1999 | Hussey et al. ......... 235/462.07 |
| 6,012,102 A | * | 1/2000 | Shachar ........................ 710/5 |
| 6,302,329 B1 | * | 10/2001 | Iwai et al. .................. 235/494 |

* cited by examiner

Primary Examiner—Michael G. Lee
Assistant Examiner—Ahshik Kim

(57) ABSTRACT

Methods and apparatus utilizing visually distinctive bar code symbols are described. An article is provided with a bar code symbol including a bar code. The bar code comprises a sequence of first and second element types. The bar code symbol is made visually distinctive through one of the following features: a) at least one bar code element is not a single straight line segment; b) a contour of a bounding shape of the smallest area encompassing the bar code has at least two adjacent sides that are not perpendicular; or c) a contour of a bounding shape of the smallest area encompassing an encoding region has no side such that one end of all the bar code elements within the region touches that side. A selectable resolver is used to identify a resource for the encoded value. The resolver may access the resource to provide additional information about the article.

19 Claims, 7 Drawing Sheets

UPC-A+2

EAN-13 +2

EANUCC

CODABAR

CODE 39

CODE 128

INTERLEAVED 2/5

DISCRETE 2/5

POSTNET

BPO

METHODS AND APPARATUS UTILIZING VISUALLY DISTINCTIVE BARCODES

FIELD OF THE INVENTION

This invention relates to the field of automatic identification and data capture. In particular, this invention is drawn to visually distinctive bar code symbols.

BACKGROUND OF THE INVENTION

Automatic Identification and Data Capture (AIDC) is a term frequently used to describe the identification of articles and collection of data into a processor controlled device without the use of a keyboard. AIDC technology is designed to increase efficiency in collection and identification by reducing errors and increasing the rate of identification and collection.

Bar code symbols and bar codes represent one type of AIDC technology. Bar codes have become ubiquitous parts of everyday commercial transactions. Merchandise carried by grocery stores, for example, is labeled with a barcode. A scanner is used to identify an item at the point of purchase by the consumer. The scanner uses the bar code information to look up the item's price. The price is then provided to a cash register for tallying the customer's bill.

Bar codes traditionally consist of a sequence of two element types: bars and spaces. The bars and spaces are arranged such that the bars are parallel and the spaces separate the bars. One encoding methodology varies the width and the sequence of the elements to encode alphanumeric data. The particular encoding methodology is referred to as a barcode symbology. An optical scanner is used to read the bar code symbol and decode the bar code to provide the original alphanumeric data.

The use of the data may vary depending upon the needs of the inquiring entity. A grocery store, for example, may need a unique identifier for a particular product in order to enable calculation of price at checkout or for managing inventory. A medical supplier, however, may need to identify manufacturing dates, lot numbers, expiration dates, and other information about the same product to enable better distribution control. The level of identification needed may vary depending upon the intended use.

Bar code symbologies are efficiently designed to support a specific industry need rather than a wide range of needs. A number of bar code symbologies are presently being used to track products throughout their life expectancy as they are manufactured, distributed, stored, sold, serviced, and disposed of. The bar code symbology designed for one application, however, may not suffice the needs of another application.

The article can be marked with multiple bar codes to address the needs of the various applications. One disadvantage of introducing multiple bar codes is that scanning efficiency may decrease. In particular, if the bar code symbols are based on the same bar code symbology but are otherwise not encoding identical values, the scanner may incorrectly interpret the encoded information if the wrong bar code is scanned.

Even if different bar code symbologies are used, the scanning efficiency will be reduced. The bar code symbol associated with a particular symbology may not be readily apparent to the average human operator of the scanner. The bar codes of different symbologies still appear as a sequence of parallel bars aligned in a rectangular shape. Thus the operator may attempt to scan the wrong bar code. After several retries, the operator may realize that the wrong bar code has been selected. Alternatively, the scanner itself may be capable of interpreting more than one bar code symbology which can create difficulties if the use of different symbologies is relied upon to distinguish the bar code uses. The number of bar code symbologies would unnecessarily proliferate to support new uses, if distinct symbologies are required when marking the article.

SUMMARY OF THE INVENTION

In view of limitations of known systems and methods, methods and apparatus utilizing visually distinctive bar code symbols are described.

A method includes the step of providing an article with a barcode symbol including a bar code. The bar code includes a sequence of first and second element types. At least one of the following features is used to render the bar code visually distinctive: a) at least one bar code element is not a single straight line segment; b) a contour of a bounding shape of the smallest area encompassing all the elements of a region of encoding of the bar code has at least two adjacent sides that are non-perpendicular; and c) a contour of a bounding shape of the smallest area encompassing the bar code has no side such that one end of all the bar code elements is touching that side. Curvilinear or polygonal bar code elements may be selected, for example.

Another method includes the step of scanning a bar code symbol to generate a decoded value. A resolver is selected for the bar code symbol. The resolver associates the bar code symbol with a resource. In one embodiment, the resolver accesses the resource with the decoded value.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Bar code symbology refers to a pre-determined manner in which bar codes encode alphanumeric text. Bar code symbologies may be classified into at least two categories: linear (one dimensional) and two dimensional (2D).

Linear bar code symbologies comprise a single row of bars and spaces that are read by scanning the bar code predominately along a scanning line substantially perpendicular (90°) to the individual elements comprising the bar code symbol. Scanners are frequently capable of interpreting linear bar codes even when scanned at significant departures from 90°.

Numerous bar code symbologies have been developed, each with features particular to its intended use. For example, code 39 is a variable length symbology used predominately in the non-retail field. Code 39 provides for an optional checksum character as well as concatenation of bar codes that are not continuous. Universal Product Code (including UPC-A and UPC-E) is a symbology used predominately in retail sales. UPC-A, for example allows for an 11 character code and a checksum character. The first character identifies the type of product being identified. The following 5 characters identify a manufacturer. The last 5 characters are typically used to identify a specific product.

Figure 1:
FIG. 1 illustrates data encoded using various linear bar code symbologies.
Figure 1:
Figure 1:
Figure 1:
Figure 1:
Figure 1:
Figure 1:
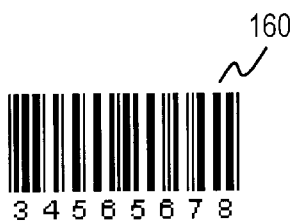
Figure 1:
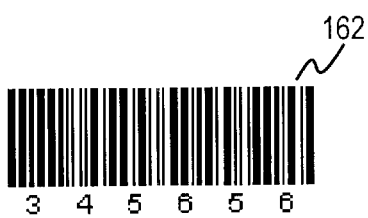
Figure 1:
Figure 1:
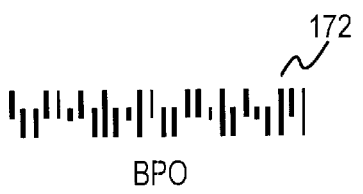

FIG. 1 illustrates bar code symbols for a variety of linear bar code symbologies including Code 39 (140), interleaved 2 of 5 (160), discrete 2 of 5 (162), Universal Product Code +2 (110), European Article Number-13+2 (112), EANUCC (120), Code 128 (150), and Codabar (130). Information is encoded by varying the width and sequence of the bars.

Other 1D bar codes store information by varying the height of the bars. For example, PostNet (170) utilized by the United States Postal Service stores information by varying the height of the bars while maintaining a constant distance between bars. Another bar code symbology (BPO 172) is used by the British Post Office. BPO 172 provides for varying lengths or positions of the bars along one axis while maintaining equidistant spacing between bars along a perpendicular axis.

Generally, linear bar code symbologies vary parameters such as the width of the bars, height of the bars, distance between bars, and combinations of these parameters to encode information.

Figure 2:
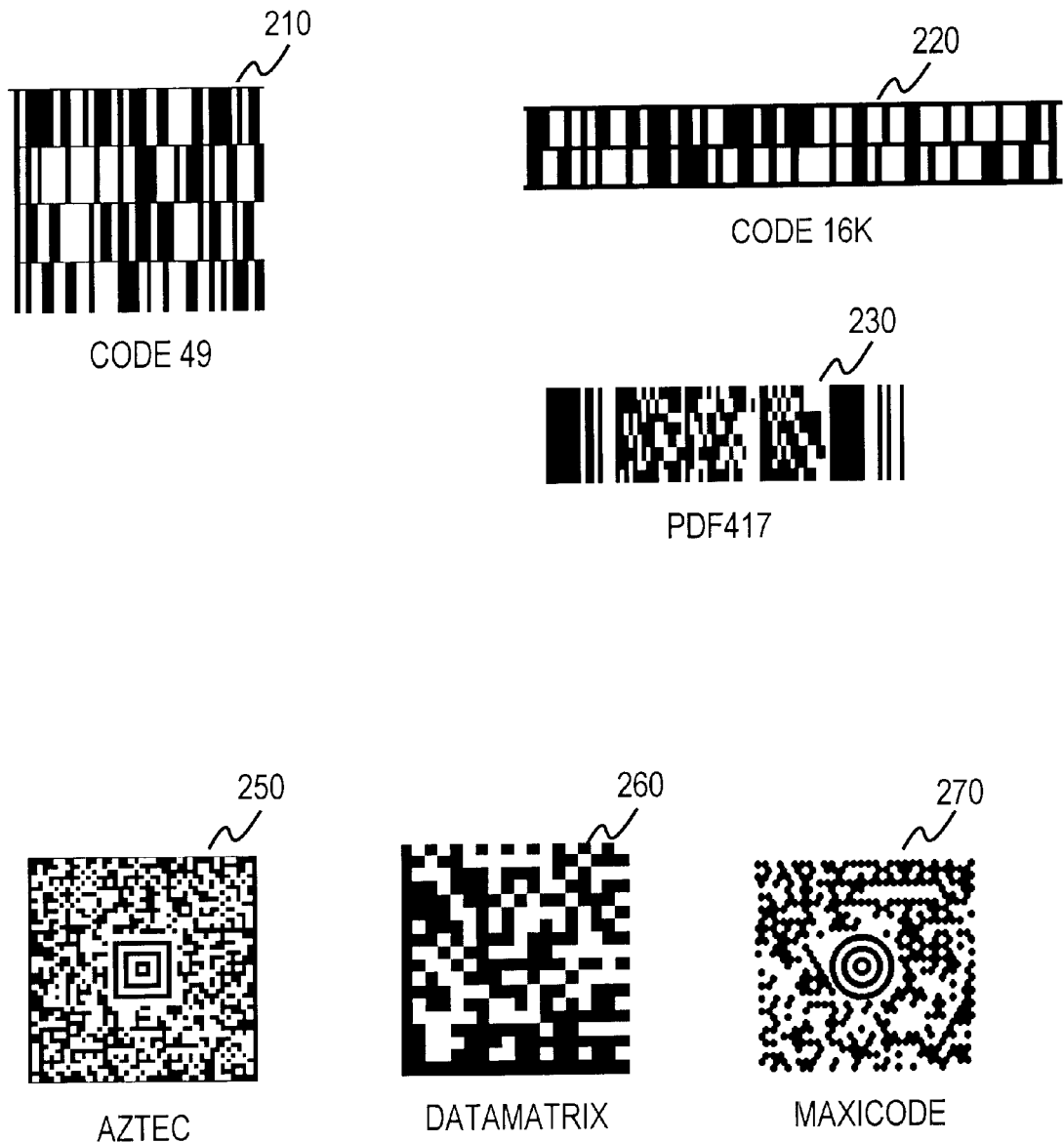
FIG. 2 illustrates bar codes of 2-D bar code symbologies.

2D bar codes can be further classified as "stacked" or "matrix." Stacked bar codes comprise several rows of linear bar codes stacked one on top of another. Stacked bar codes may be read by multiple linear scans sufficiently displaced to ensure each of the individual rows is ultimately uniquely scanned. FIG. 2 illustrates examples of stacked bar codes including Code 49 (210), Code 16K (220), PDF417 (230), and CodaBlock (240).

Matrix bar code symbologies consist of polygonal arrays of data cells and orientation structures. Matrix bar code symbols are scanned using an array of sensors rather than a single sensor. Exemplary matrix bar code symbologies include Data Matrix 250, Maxicode 260, Aztec 270, and Vericode (not illustrated).

Figure 3:
FIG. 3 illustrates components of a bar code symbol.
Figure 3:
Figure 3:
Figure 3:
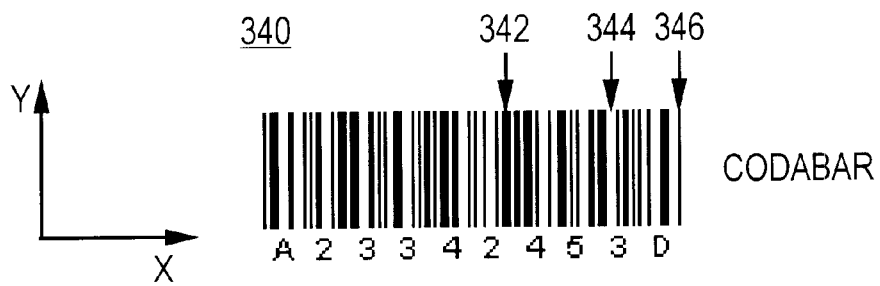

FIG. 3 illustrates the anatomy of bar code symbols based on a linear bar code symbology. Each bar code symbol 310 (320) typically includes a bar code 312 (322) and an interpretation line 316 (326). The interpretation line translates the encoded information into readable characters. When printed, the bar code symbols may also include "quiet zones" that serve as a buffer between the bar code and any other images or text that may interfere with the operation of the scanner. Quiet zones aid the scanner with locating the bar code and are frequently used to establish directional reading information for the scanner.

Referring to bar code symbol 340, the bar code portion of the symbol is composed of bars (342, 346) and spaces (344) which are referred to as elements. The bars and spaces have different reflectivities to enable optically distinguishing bars and spaces. The actual width of the narrowest (x-axis) element is defined by the "x-dimension." The width of the narrowest element (346) defines a module. For a given bar code symbology, wider elements (342, 344) are frequently defined in terms of numbers of modules.

Each linear bar code symbology provides for at least one set of elements (bars and spaces) which form a complete unit of encoding. Some bar code symbologies permit code extensions to effectively support multiple units or sets of encoded information within the same bar code symbol. Bar code symbol 330, for example, includes the basic UPC bar code 332 set and a 2 character extension set 336. The individual sets corresponding to individual units or regions of encoding (334, 338) may be collectively treated as a single bar code.

Regardless of the bar code symbology selected, the resulting bar code symbols tend to have common features which do not render them readily distinguishable to the human eye. Thus if a product has multiple bar code symbols, consumers or users may have difficulty identifying the bar code symbol associated with their application.

For example, bar code symbols 310, 320, and 340 encode different information as indicated by their respective interpretation lines. (Bar codes 320 and 330 encode the same information). Bar code symbols 310, 320, and 340 are also based on different bar code symbologies. Even though different bar code symbologies are being used to encode different values, the resulting bar code symbols have basic features in common.

In particular, each of the linear bar code symbols of FIG. 3 utilizes single straight line segments for the bar elements (e.g., 342, 344). Moreover, the contour of each region (334, 338) of encoding tends to be polygonal in shape such that each side of the contour is perpendicular to its adjacent sides. The contour in this context is defined by the shape that circumscribes or bounds the region of encoding so as to contain every element within the region of encoding while encompassing the smallest area. The line segments of the bar codes of FIG. 3 are either parallel or perpendicular to each side of their respective bounding polygons. Moreover, within a given region of encoding, at least one end of all the bar elements tend to lie on a same side of the bounding polygon. The bar elements are thus aligned such that corresponding ends of the bar elements lie along a common line.

Visually distinctive bar code symbols can be created by changing one or more of these common features. In particular, visually distinctive bar code symbols may be formed through the use of elements other than single straight line segments. Alternatively, rotation, translation, or other transformations may be performed on the individual bar code elements so that the contour of the bar code is not a rectangle. If the contour is a polygon, the bar code may be transformed so that at least one side is not perpendicular to an adjacent side. Alternatively, the bar code elements may be positioned so that neither the tops nor the bottoms of all the elements touch the same side. These distinctive features can also be combined to form the visually distinctive bar code symbol. Generally, features other than the parameters used for encoding (e.g., width of the elements) are being modified to distinguish these bar codes from traditional bar codes.

Along the scanning line of the scanner, the visually distinctive bar code symbol must still consist of "bars" and "spaces" of different reflectivity. Given that the scanning window is typically very small, however, the visually distinctive bar code need be concerned about the appearance of the bar code at a micro (i.e., scanning window size) level rather than meeting the same requirements at a macro (i.e., the symbol as a whole) level. Thus numerous transformations may be performed on the bar code elements or the shape of the bar code symbol as long as the linear scanning property is maintained at a micro level. For example, a standard barcode scanner can still be used to scan the bar code symbol if at least one rectangle could be drawn such that the bar code portion within the rectangle provides a linear scanning line. Such transformations may be more appropriate for linear bar code symbologies where the width of the bars and spaces rather than the length of the bars and spaces is the encoding parameter.

Figure 4:
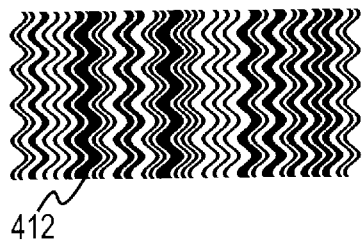
FIG. 4 illustrates embodiments of visually distinctive linear bar codes with curvilinear elements or multiple straight line segment elements.
Figure 4:

FIG. 4 illustrates one embodiment of a bar code symbol 410 that is visually distinctive from the linear bar codes of FIGS. 1 and 3. Although the contour of bar code symbol 410 is still substantially rectangular, the elements are not. In the illustrated embodiment, individual bars (e.g., 412) are wavy or curvilinear rather than straight line segments. Bar code symbol 420 illustrates another embodiment of a bar code where some of the elements (e.g., 422) comprise multiple line segments. Thus both 410 and 420 illustrate bar codes having elements that are not single straight line segments.

Figure 5:
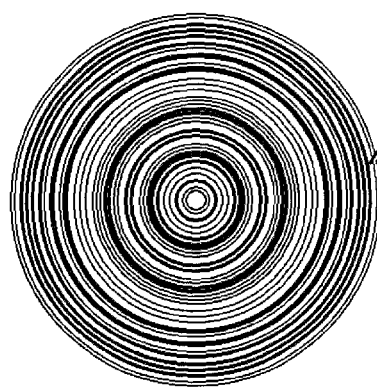
FIG. 5 illustrates one embodiment of a visually distinctive linear bar code having concentric elements.
Figure 5:
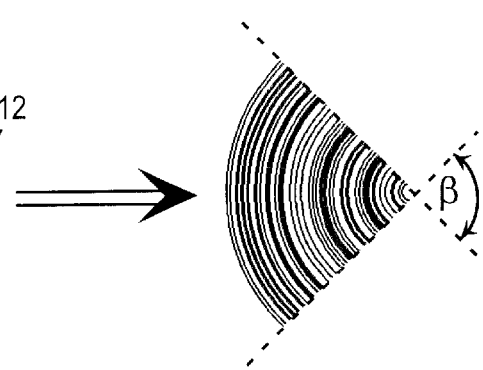

FIG. 5 illustrates another embodiment of a bar code symbol that has elements that are not single straight line segments. The bar code symbol is also not rectangular in shape. In particular, the contour of bar code symbol 500 is substantially circular. The bar elements (e.g., 512) form concentric circles. The spaces are the gap between the bars and thus are also circular. The bar code is composed of a plurality of concentric circles of bars and spaces.

Polygons such as triangles, quadrilaterals (e.g., squares, rectangles, parallelograms, trapezoids), pentagons, hexagons, etc. may be used as bar code elements in concentric fashion to achieve both of these features. In one embodiment, the bars are regular polygons (i.e., all angles and side lengths are identical). In various embodiments, the bar elements may be convex, concave, or star shaped polygons. Scanning in one or more directions, however, may be impaired unless regular convex polygons are selected when the bar code symbology defines bar elements as concentric polygons. The use of concentric elements results in a bar code symbol having a contour with substantially the same shape as that of its elements. Successful scanning of the concentric bar codes only requires scanning from the perimeter to the center.

The bar code elements need not be polygons or closed shapes. For example, circular bar code symbol 510 is scannable along any scanning line that passes through the center of the bar code symbol. A subset 520 of the bar code symbol corresponding to a sector of any angular measure β preserves the scanning property as long as the scanning line passes along a path substantially normal to each element to the focus (i.e., the former center) of the bar code symbol. In this example the bar code elements are arcs which form a sector-shaped contour. In other embodiments, each bar code element is rectilinear (i.e., composed of a plurality of connected line segments) instead of arc shaped.

Figure 6:
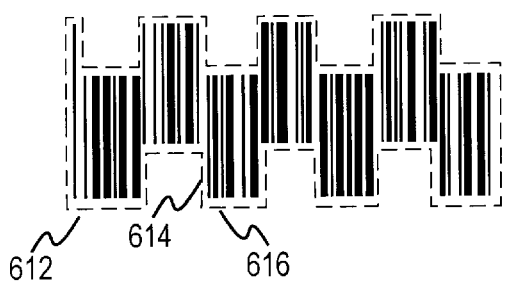
FIG. 6 illustrates visually distinctive bar codes having polygonal contours.
Figure 6:
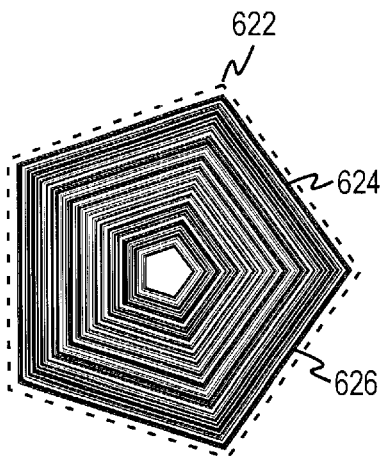

FIG. 6 illustrates a bar code 610 having a contour 612 that defines a polygon. Each side of contour 612 is perpendicular to its adjacent side (e.g., 614, 616). Nonetheless, the bar code is visually distinctive because neither the tops nor the bottoms of all the elements touch the same side of the contour 612. (Note that the contour has been exaggerated in size for visual clarity, but that in reality the contour would touch the endpoints of every element in this example). Thus although the bar code has a polygonal contour where each side is perpendicular to its adjacent side, there is no single side such that one end of all the elements are aligned with that side.

The contour of bar code 620 is also a polygon. However, unlike bar code 610, the contour 622 of bar code 620 has adjacent sides 624, 626 that are not perpendicular to each other. Another feature that renders this bar code visually distinctive is the use of bar code elements other than single straight line segments. In this example, the bar code 620 is formed from concentric regular pentagons. The size of each individual element is dependent upon its position within the sequence.

Although the elements, the alignment of the elements, or the overall shape are changed, the encoding scheme of any linear bar code symbology may still be applied. Predetermined bar code maximum widths, however, may create limits as to the amplitude of the wavy elements or the radius of the concentric bar codes. The rate of change (e.g., frequency) possible within wavy or other curvilinear bar elements may be dependent upon the tolerances of scanners as well as the size of the scanning window.

Additional modifications can be made to the bar code symbol to render it visually distinctive. For example, the bar code symbol can be scaled (i.e., larger or smaller) within the resolution limits permitted by the appropriate bar code symbology. The bar code symbol may be masked with another image such that the bar code is preserved, but the bar code symbol is no longer limited to a rectangular contour. The color of the bars and spaces may be varied relative to each other. Thus, for example, a red/white combination might be used so long as there is a clear threshold between the reflectivity of the selected bar color and the selected space color. Moreover, the color of the bar element may vary within the same bar code symbol. Similarly, the color of the space element may vary within the same bar code symbol. Combinations of any of these modifications may be made so long as a linear scanning line is preserved in the resulting bar code symbol and so long as sufficient differences in reflectivity are maintained such that the scanner can distinguish between bars and spaces.

Figure 7:
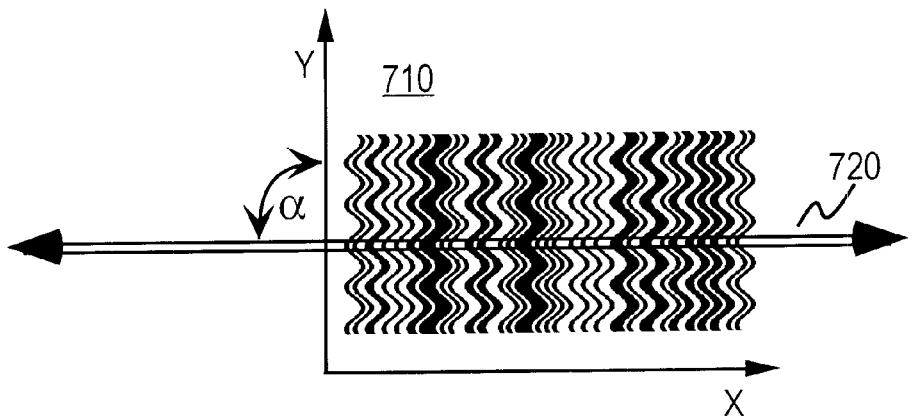
FIG. 7 illustrates scanning lines for visually distinctive bar codes.
Figure 7:
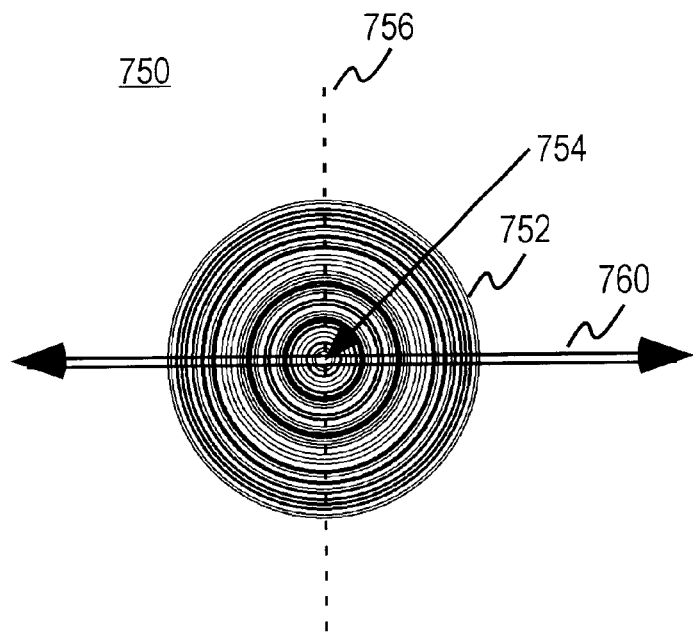

FIG. 7 illustrates scanning lines for the bar codes of FIGS. 4–6. Scanning line 720 passes through wavy bar code symbol 710. Typically the detection mechanism is sufficiently robust to accurately read the bar code even when angle α varies substantially from 90° as long as the scanning line passes through every element of the bar code. Given the narrow width of the scanning line, the scanner is relatively insensitive to the non-rectilinear nature of the bar code elements.

For the concentric bar code symbol 750, the scanning line must pass through the outermost bar element 752 at the perimeter of the bar code symbol 750 through a point substantially near the center 754 of the symbol to ensure that the innermost bar element is scanned. Dotted line 756 indicates a point of demarcation after which the bar code information would be duplicated when scanning along scanning line 760. The scanner will redundantly read the bar coded information if the scanning line 760 passes substantially near the center all the way to the other side of bar code symbol 750 when circles or regular convex polygons are chosen for bar code elements. One advantage of circles or regular convex polygons shapes is that the orientation of the bar code symbol is substantially irrelevant for scanning purposes. Thus, a scanner will still be able to successfully scan bar code symbol 750 even if scanning line 760 and bar code symbol 750 are rotated with respect to each other.

In one embodiment, a selectable resolver may be used to provide the user with additional information about the bar coded article. If visually distinctive bar code symbols are used, they may serve as indicators as to whether the bar code is readable by one or more specific resolvers.

Figure 8:
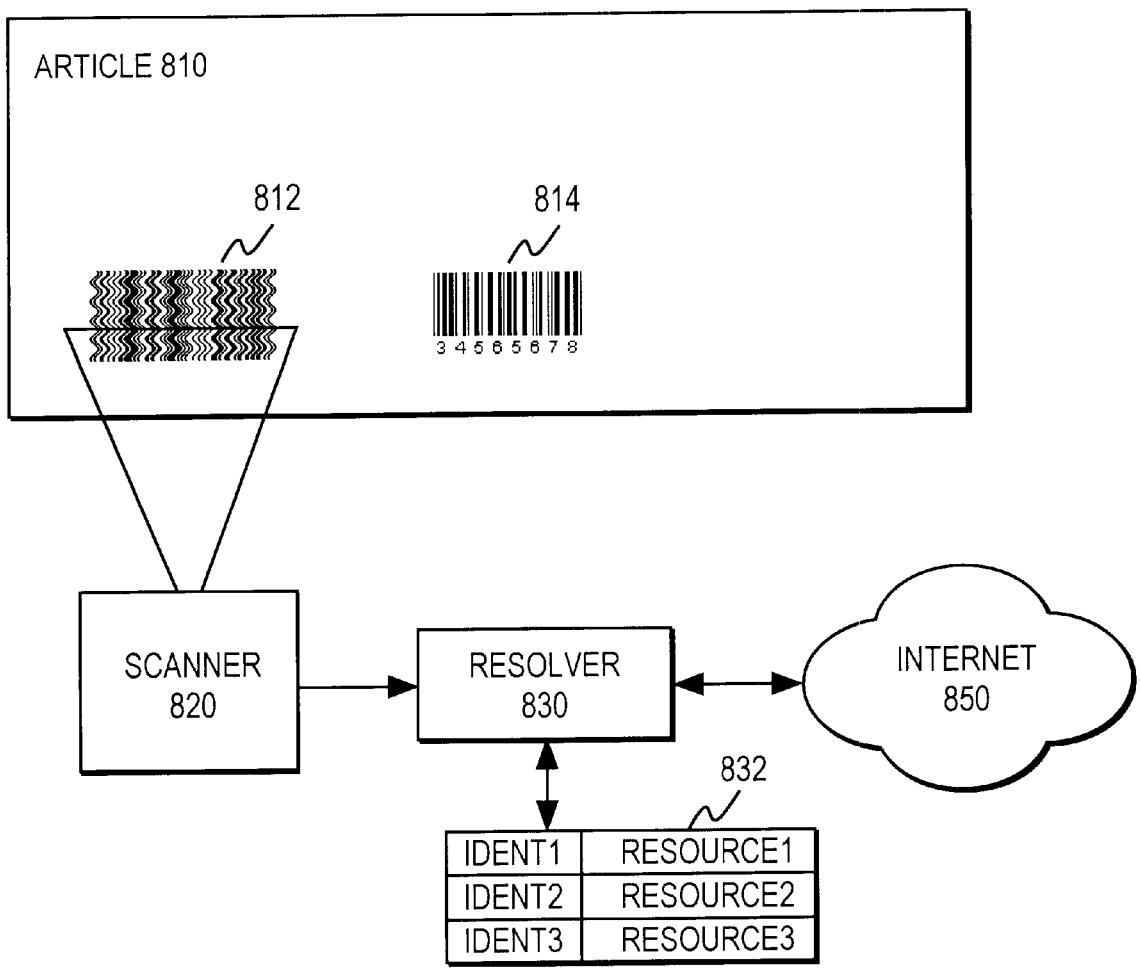
FIG. 8 illustrates an apparatus for accessing a resource identified with a value decoded from a visually distinctive bar code symbol.

FIG. 8 illustrates one embodiment of an apparatus for scanning a bar code symbol such as visually distinctive bar code symbol 812 from article 810. Article 810 may be marked with additional bar code symbols such as bar code symbol 814. The visually distinctive nature of bar code symbol 812 enables readily distinguishing it from other bar code symbols.

The visually distinctive bar code symbol 812 is scanned by scanner 820. Scanner 820 translates the bar code symbol into a decoded value or identifier which is provided to a resolver 830 selected by the user. Resolver 830 has access to an identifier-resource table 832. In one embodiment, table 832 is stored local to resolver 830. Alternatively, table 832 may reside on a remote resource such as a host computer distinct from the resolver.

Table 832 is a lookup table for the identifier. Table 832 associates the identifier with the address of one or more resources regarding the identifier. In one embodiment, the entries of table 832 are identifier independent such that all identifiers are mapped to the same resource or resources for subsequent handling by those resources. Alternatively, table 832 may be designed such that only a portion of the identifier is used to lookup a resource. In such cases, fewer rows are needed to map distinct identifiers to the same resources.

In one embodiment, the resolver provides the address of the resource(s) associated with the identifier to the user. Alternatively, the resolver may access the resource(s) with the identifier and return the result to the user. The resources may include other resolvers.

In one embodiment, the resource(s) include web resources such as web pages. Uniform resource identifiers (URIs) are used to identify a particular resource on the Internet or within an intranet. URIs may include, for example, uniform resource locators (URLs) and uniform resource names (URNs). URNs may be further resolved to URLs. A URL identifies a host computer either explicitly or implicitly. The URL may also specify a specific file residing on the computer which may be interpreted to produce a web page. Generally, a URL is an address of a specific resource on any network of computers. Thus, the lookup table 832 may associate identifiers with URIs or the addresses of other computational resources such as Java® objects.

Figure 9:
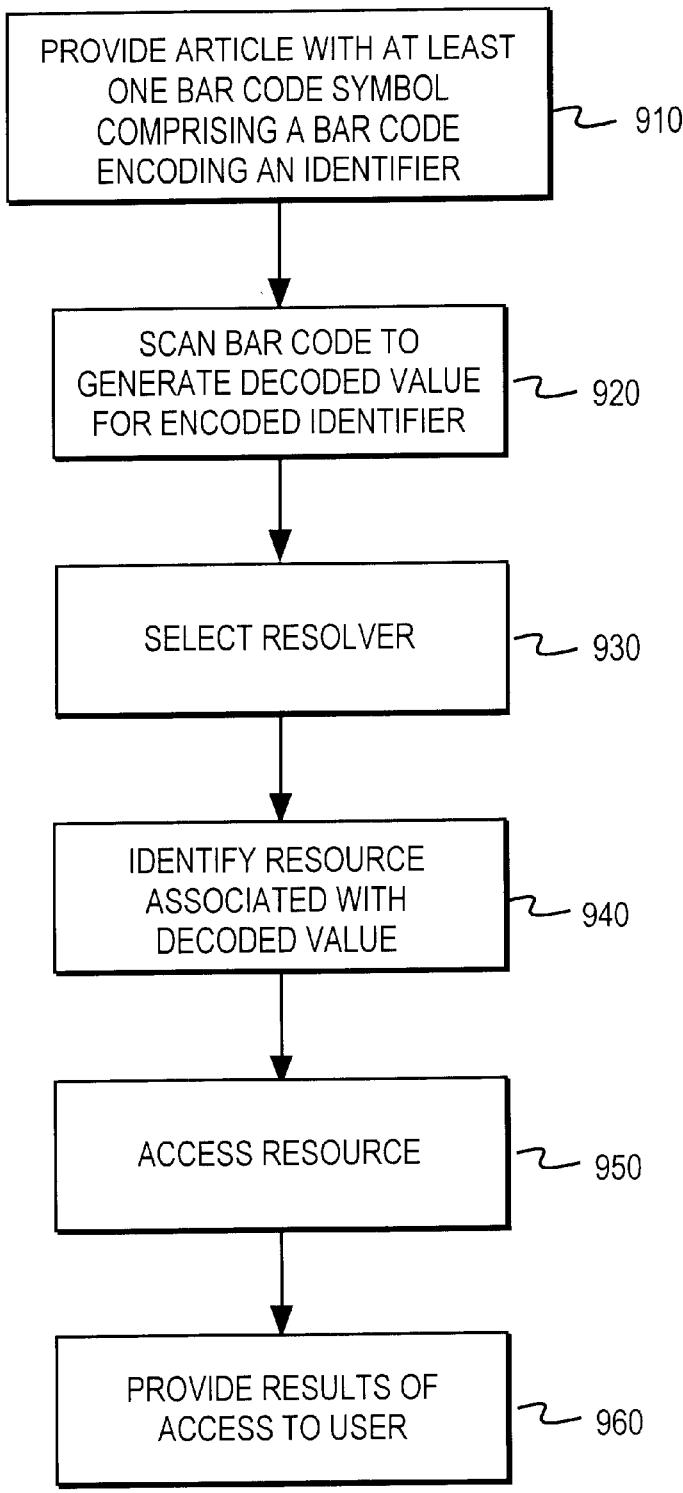
FIG. 9 illustrates a method for using a selected resolver to access a resource with a value decoded from a bar code symbol.

FIG. 9 illustrates one embodiment of a method that supports multiple web page associations for a bar code symbol. An article with a bar code symbol is provided in step 910. In step 920, the bar code symbol is scanned to generate a decoded value or identifier.

In step 930, a resolver is selected for the bar code symbol. The resolver is selected based on the intended use. For example, in grocery applications, a resolver for determining sugar content might be selected. The use of visually distinctive bar code symbols may facilitate selection of the resolver. Thus, for example, visually distinctive bar code symbols of a particular shape may indicate that the encoded information is intended for determining nutritional information. Thus the appearance of the bar code symbol may indicate a specific resolver or otherwise provide sufficient information to enable selecting a specific resolver from a list of pre-determined resolvers.

The resolver associates the identifier with a specific resource in step 940. In one embodiment, the identifier is associated with a web resource identified by a URL. In one embodiment, the resolver accesses the resource in step 950 instead of merely identifying the resource to the client. For a web resource this might entail accessing the resource identified by a URL.

The action performed when accessing the resource may depend upon the user's specific application. Depending upon the application, the resolver presents the result of the access to the user in step 960. In the event the user is updating a database, the result can be confirmation or status of the requested update. If the user is requesting a resource such as a web page, the result might be displaying the web page.

Consider, for example, grocery items marked with multiple bar code symbols. A first bar code symbol identifies the product to the checkout scanners for pricing and inventory control. A second bar code symbol more specifically provides a serial number for identifying lot number and expiration date. The first symbol is scanned by the grocery store for pricing information. The second symbol is scanned by the grocery store to identify individual articles that have exceeded their shelf life or need to otherwise be pulled from the shelves.

If the article is a pharmaceutical product, the resolver can link the article to a manufacturer's, regulatory agency's, or other entity's web page for information pertinent to that article specifically. Thus contamination or recall notices about specific lots or batches of the article are readily accessible and articles subject to those recalls are readily identifiable through the scanning process. The pharmaceutical product may even have bar code data pertaining to the prescription of the medication to a particular patient.

Depending upon the information encoded, consumers can use the same bar code symbol to obtain information for very different purposes by using a different resolver. Thus, for example, a pricing resolver used by a grocery store may be used to look up the price of an article identified by a given bar code symbol at the time of checkout. A dietary resolver, however, might use the same bar code symbol to obtain other information about the article.

The dietary resolver can be used to identify food items that meet specific medical or religious requirements. A diabetic might use a first resolver to determine whether the item is approved for a diabetic diet based on sugar content. Another consumer can use a second resolver to determine whether the item is compatible with specific religious requirements.

Another scenario for the use of different resolvers with the same identifier to obtain information suitable to different needs is in the context of automobiles. Vehicle identification numbers (VIN), for example, are frequently presented in bar code symbol form in conspicuous locations on cars and trucks. VINs are serial numbers that identify a vehicle uniquely but also provides more generic information such as the manufacturer and the model of the vehicle.

A police officer might scan the VIN to determine whether the vehicle is stolen using a resolver that links the identifier to a national database of stolen vehicles. A mechanic might scan the same VIN with a different resolver that uses the manufacturer and/or model information from the VIN to match the VIN to a specific manufacturer's database. Thus the police officer may need to determine the ownership or legal status of a vehicle using one resource. The mechanic, however, may need the same VIN to identify warranty information, repair history, whether recall notices apply to the vehicle, etc. Through selection of the resolver, the same identifier is used when accessing different resources in accordance with the needs of the user. In an alternative embodiment, the automobile may be marked with different bar code symbols that are made visually distinctive such that the user easily locates the bar code symbol to be used for their intended purpose.

The use of visually distinctive bar codes serves as an enabling mechanism for rapid identification of a bar code symbol intended for one or more specific purposes. Given that the bar code design enables users to readily distinguish bar code symbols intended for a specific purpose from any other bar code symbols, there is no need to prohibit the use of other bar codes using the same bar code symbology.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising the step of:
   providing an article with a bar code symbol including a bar code of linear bar code symbology, wherein the bar code comprises a sequence of first and second element types, wherein a contour defined by a bounding shape of the least area encompassing all the bar code elements has at least two non-perpendicular adjacent sides.

2. The method of claim 1 wherein a curvature of each element type varies along its length.

3. The method of claim 1 wherein the element types are polygonal.

4. The method of claim 1 wherein the element types are multi-segmented rectilinear.

5. The method of claim 1 wherein the bar code symbol comprises concentric elements.

6. A method comprising the step of:
   providing an article with a bar code symbol including a bar code of linear bar code symbology, wherein the bar code comprises a sequence of first and second element types, wherein each side of a contour defined by a polygon of the least area encompassing all the bar code elements is perpendicular to an adjacent side, wherein elements of a same type are not equidistant from each other, wherein there is no side such that one end of all the elements touches that side.

7. The method of claim 6 wherein a curvature of each element type varies along its length.

8. A method comprising the step of:
   providing an article with a bar code symbol including a bar code of linear bar code symbology, wherein the bar code comprises one or more units of encoding, wherein at least one unit of encoding comprises a sequence of first and second element types, wherein the first and second element types have at least one of the following properties:
   a) at least a portion of each element type is multi-segmented rectilinear; and
   b) at least a portion of each element type has a varying curvature.

9. The method of claim 8 wherein the element types are polygonal.

10. The method of claim 8 wherein a contour of the bar code forms a shape other than a polygon having all sides perpendicular to respective adjacent sides.

11. The method of claim 8 wherein the bar code is composed of concentric elements.

12. A method comprising the steps of:
    a) scanning a bar code symbol to generate a decoded value;
    b) selecting a resolver for the decoded value from a plurality of different resolvers, wherein each resolver identifies a resource for the decoded value; and
    c) accessing the resource identified by the selected resolver for the decoded value.

13. The method of claim 12 wherein the bar code is a linear bar code.

14. The method of claim 12 wherein the resource is identified as a uniform resource locator (URL).

15. The method of claim 12 wherein at least one resolver includes a lookup table to associate the decoded value with a corresponding resource.

16. An apparatus comprising:
    an article of manufacture having at least one bar code symbol including a visually distinctive bar code symbol of a linear bar code symbology, wherein the visually distinctive bar code symbol further comprises a bar code having at least two element types, wherein the visually distinctive bar code is distinguished through any one of the following features:
    a) at least a portion of each element type is multi-segmented rectilinear;
    b) at least a portion of each element type has a varying curvature;
    c) a contour of a bounding shape of the smallest area encompassing all the elements of a region of encoding of the bar code has at least two adjacent sides that are non-perpendicular; and
    d) a contour of a bounding shape of the smallest area encompassing an encoding region has no side such that one end of all the bar code elements of the region touches that side.

17. The apparatus of claim 16 having a plurality of bar code symbols.

18. The apparatus of claim 16 wherein the bar code comprises concentric elements.

19. A method comprising the step of:
    providing an article with a bar code symbol including a bar code of linear bar code symbology, wherein the bar code comprises a sequence of first and second element types, wherein each side of a contour defined by a polygon of the least area encompassing all the bar code elements is perpendicular to an adjacent side, wherein there is no side such that one end of all the elements touches that side, wherein a curvature of each element type varies along its length.

* * * * *